(12) United States Patent
Wang et al.

(10) Patent No.: US 10,735,082 B2
(45) Date of Patent: Aug. 4, 2020

(54) EFFICIENT MULTI-BAND COMMUNICATION SYSTEM

(71) Applicant: KONINKLIJKE PHILIPS N.V., Eindhoven (NL)

(72) Inventors: Dong Wang, Scarsdale, NY (US); Jun Yang, Croton-on-the-Hudson, NY (US); Dagnachew Birru, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 507 days.

(21) Appl. No.: 15/369,970

(22) Filed: Dec. 6, 2016

(65) Prior Publication Data

US 2017/0085311 A1    Mar. 23, 2017

Related U.S. Application Data

(63) Continuation of application No. 12/867,924, filed as application No. PCT/IB2009/050970 on Mar. 9, 2009, now Pat. No. 9,590,830.
(Continued)

(51) Int. Cl.
*H04B 7/12*      (2006.01)
*H04L 1/00*      (2006.01)
(Continued)

(52) U.S. Cl.
CPC .............. *H04B 7/12* (2013.01); *H04L 1/0003* (2013.01); *H04L 1/0009* (2013.01);
(Continued)

(58) Field of Classification Search
CPC .......... H04B 2001/7154; H04B 1/7143; H04B 1/707; H04B 1/40; H04B 3/23;
(Continued)

(56) References Cited

U.S. PATENT DOCUMENTS 7,184,485 B2   2/2007   Balakrishnan
7,292,620 B2   11/2007  Green
(Continued)

FOREIGN PATENT DOCUMENTS

KR      20050014695 A    2/2005
WO      WO2006088081 A1  8/2006
(Continued)

OTHER PUBLICATIONS

"High Rate Ultra Wideband PHY and MAC Standard", Standard ECMA-368, 1st Edition—Dec. 2005.
(Continued)

*Primary Examiner* — Janice N Tieu

(57) ABSTRACT

A multi-band communication system includes a plurality of transmit channels, where each transmit channel transmits data streams through a single sub-band, and a plurality of receive channels, where each receive channel receives data streams of a single sub-band. According to one embodiment of the invention, each transmit channel and its respective receive channel are configured with a different set of channel codes to encode and decode the data. The set of channel codes is determined by an adaptive modulation coding controller based on a condition of the link between a transmit channel and a receive channel.

7 Claims, 6 Drawing Sheets

Related U.S. Application Data

(60) Provisional application No. 61/156,107, filed on Feb. 27, 2009, provisional application No. 61/035,136, filed on Mar. 10, 2008.

(51) Int. Cl.
  *H04L 5/00* (2006.01)
  *H04L 27/26* (2006.01)
  *H04B 1/7163* (2011.01)

(52) U.S. Cl.
  CPC ........ *H04L 5/0007* (2013.01); *H04L 27/2601* (2013.01); *H04B 1/7163* (2013.01)

(58) Field of Classification Search
  CPC ...... H04J 13/10; H04L 25/0266; H04L 7/033; H04L 27/2647; H04L 5/0007
  See application file for complete search history.

(56) References Cited

U.S. PATENT DOCUMENTS

| | | | |
|---|---|---|---|
| 2003/0048856 A1* | 3/2003 | Ketchum | H04L 1/0009 375/260 |
| 2003/0128772 A1 | 7/2003 | Michael | |
| 2004/0047285 A1* | 3/2004 | Foerster | H04B 1/692 370/210 |
| 2005/0031047 A1 | 2/2005 | Maltsev | |
| 2005/0157803 A1 | 7/2005 | Kim | |
| 2006/0153279 A1* | 7/2006 | Birru | H04B 1/715 375/130 |
| 2007/0189151 A1 | 8/2007 | Pan | |
| 2008/0298477 A1 | 12/2008 | Classon | |
| 2008/0310526 A1 | 12/2008 | Maltsev | |
| 2010/0309865 A1* | 12/2010 | Kimura | H04L 1/0001 370/329 |
| 2011/0032953 A1* | 2/2011 | Lee | H04B 7/2643 370/535 |

FOREIGN PATENT DOCUMENTS

| | | |
|---|---|---|
| WO | WO2007015962 A3 | 2/2007 |
| WO | WO2007085583 A1 | 8/2007 |

OTHER PUBLICATIONS

Batra A. et al., "Design of a Multiband OFDM System for Realistic UWB Channel Environments", IEEE Trans. on Microwave Theory and Techniques, vol. 52, No. 9, pp. 2123-2137, Sep. 2004.
Rohling H. et al., "Adaptive Coding and Modulation in an OFDM-TDMA Communication System", Vehicular Technology Conference, 1998, VTC 98. 48th IEEE Ottawa, Ont., Canada May 18-21, 1998, New York, NY, USA, IEEE, US, vol. 2, May 18, 1998 (May 18, 1998), pp. 773-776, XP010288041.
Pam Siriwongpairat W. et al, "Ultra-Wideband Communications Systems: Multiband OFDM Approach", Dec. 2007 (Dec. 2007), John Wiley and Sons, XP002546839.
Emeric Gueguen et al, "An OFDM-CDMA Scheme for high Rate UWB Applications", Vehicular Technology Conference, VTC2007-Spring. IEEE 65th, IEEE, Apr. 1, 2007 (Apr. 1, 2007), pp. 2905-2909, XP031093162.

* cited by examiner

| TFC-1 510 | S11 | S21 | S31 | S12 | S22 | S32 | S13 | S23 | S33 |
|---|---|---|---|---|---|---|---|---|---|

| TFC-2 520 | S11 | S31 | S21 | S12 | S32 | S22 | S13 | S33 | S32 |
|---|---|---|---|---|---|---|---|---|---|

FIG. 4

EFFICIENT MULTI-BAND COMMUNICATION SYSTEM

The invention relates generally to multi-band communication systems, and more particularly to coding techniques performed by such systems.

The WiMedia Ultra-Wideband (UWB) standard defines the specifications of a media access control (MAC) layer and a physical (PHY) layer based on multi-band orthogonal frequency division multiplexing (MB-OFDM). The WiMedia standard enables short-range multimedia file transfers at rates of 480 Mbps with low power consumption, and operates in the 3.1 GHz to 10.6 GHz range in the UWB spectrum. A UWB channel is partitioned into several sub-bands, each with a bandwidth of 528 MHz.

FIG. 1 shows a block diagram of a conventional multi-band communication system that operates in accordance with the WiMedia specification. The system comprises a transmitter 100 and a receiver 200 that communicate over a wireless medium. The transmitter 100 includes a channel encoder 110, a bit interleaver 120, a symbol mapping unit 130, and an OFDM modulator 140. Typically, the transmitter 100 implements a bit-interleaved coded modulation (BICM) technique to overcome frequency selective fading of a UWB channel. With this aim, the channel encoder 110 encodes input information bits that are later interleaved at a bit level by the bit interleaver 120, and then mapped to symbols by the symbol mapping unit 130. Typically, the bit interleaver 120 performs three steps: 1) inter-OFDM-symbol interleaving where consecutive bits are distributed to different OFDM symbols, which may be transmitted in different sub-bands; 2) intra-symbol tone interleaving where bits are permuted across the data sub-carriers of an OFDM symbol to exploit frequency diversity; and 3) intra-symbol cyclic shift interleaving where bits are cyclically shifted in successive OFDM symbols, to exploit more frequency diversity when only one sub-band is used.

Through an IFFT operation carried out by the OFDM modulator 140, the OFDM symbols are generated and transmitted through a transmit antenna 150. These OFDM symbols are transmitted either in one sub-band or multiple sub-bands through a frequency hopping, which is controlled by a time frequency code (TFC). A TFC designates the sub-band or sub-bands in which the OFDM symbols should be transmitted.

The OFDM symbols are received by the receiver 200 that extracts the information bits from received symbols. The receiver 200 includes a receive antenna 210, an OFDM demodulator 220, a symbol demapping unit 230, a bit deinterleaver 240, and a channel decoder 250. The OFDM demodulator 220 performs a FFT operation on received symbols, which are later converted to bits by the symbol demapping unit 230. The bit-deinterleaver 240 recovers the data that was interleaved by the transmitter 100, and the recovered data is processed by the channel decoder 250 to output the original information bits.

The transmitter 100 and the receiver 200 can transmit and receive data of a single UWB channel at a data rate of up to 480 Mbps. This is a limiting factor as the number applications that can be supported by, for example, the WiMedia standard is bounded. In fact, future versions of the WiMedia standard discuss transferring data at rates of 1 Gbps and above. Implementing the BICM technique at such rates by a conventional multi-band communication system, such as UWB MB-OFDM system, is not feasible.

In addition to the decoding speed limitation, a conventional multi-band communication system suffers from inefficient link and channel adaptation. This is due to the ultra wide bandwidth property wherein the channels of different UWB sub-bands are usually uncorrelated. Moreover, different sub-bands may have different pass losses. The pass-loss model, as specified by the IEEE 802.15.3, is a free-space propagation model and is defined as follows:

$$P_L(f_g, d) = 20\log_{10}\left[\frac{4\pi f_g d}{c}\right]$$

where $f_d$ denotes the geometric average of the lower and upper frequencies of a sub-band. For example, based on the above formula, the pass-loss difference between the sub-band 1 and the sub-band 3 could be 2.3 dB. As illustrated in FIG. 2 a pass-loss of 2.3 dB can cause up to 308 Mbps capacity difference when the bandwidth is 528 MHz, and the average signal to noise ratio is high. When multiple antennas are deployed, the theoretic capacity difference could be even larger.

Certain embodiments of the invention include a multi-band communication system. The system comprises a plurality of transmit channels, wherein each transmit channels transmits data streams through a single sub-band; and a plurality of receive channels, wherein each receive channel receives data streams of a single sub-band.

Certain embodiments of the invention also include a multi-band communication system. The system comprises a plurality of transmit channels, each transmit channel comprises at least: a plurality of channel encoders for encoding information bits to be transmitted through a single sub-band; and a multiplexer (MUX) for multiplexing symbols of different sub-bands based on a time frequency code (TFC), wherein all symbols belonging to a data stream are transmitted in the same sub-band.

Certain embodiments of the invention also include a method for performing a parallel encoding in a multi-band communication system. The method comprises splitting input information bits into a plurality of bit streams, wherein each bit streams belongs to a single sub-band; encoding each bit stream using at least one channel code; generating OFDM symbols from the encoded bit streams; multiplexing the OFDM symbols of a plurality of sub-bands into a data stream; and transmitting the data stream.

Certain embodiments of the invention also include a computer-readable medium having stored thereon computer executable code, when executed by a computer, for performing a parallel encoding in a multi-band communication system. The computer executable code causes a computer to execute the process of splitting input information bits into a plurality of bit streams, wherein each bit streams belongs to a single sub-band; encoding each bit stream using at least one channel code; generating OFDM symbols from the encoded bit streams; multiplexing the OFDM symbols of a plurality of sub-bands into a data stream; and transmitting the data stream.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 4 illustrate two TFC patterns;

Figure 1:
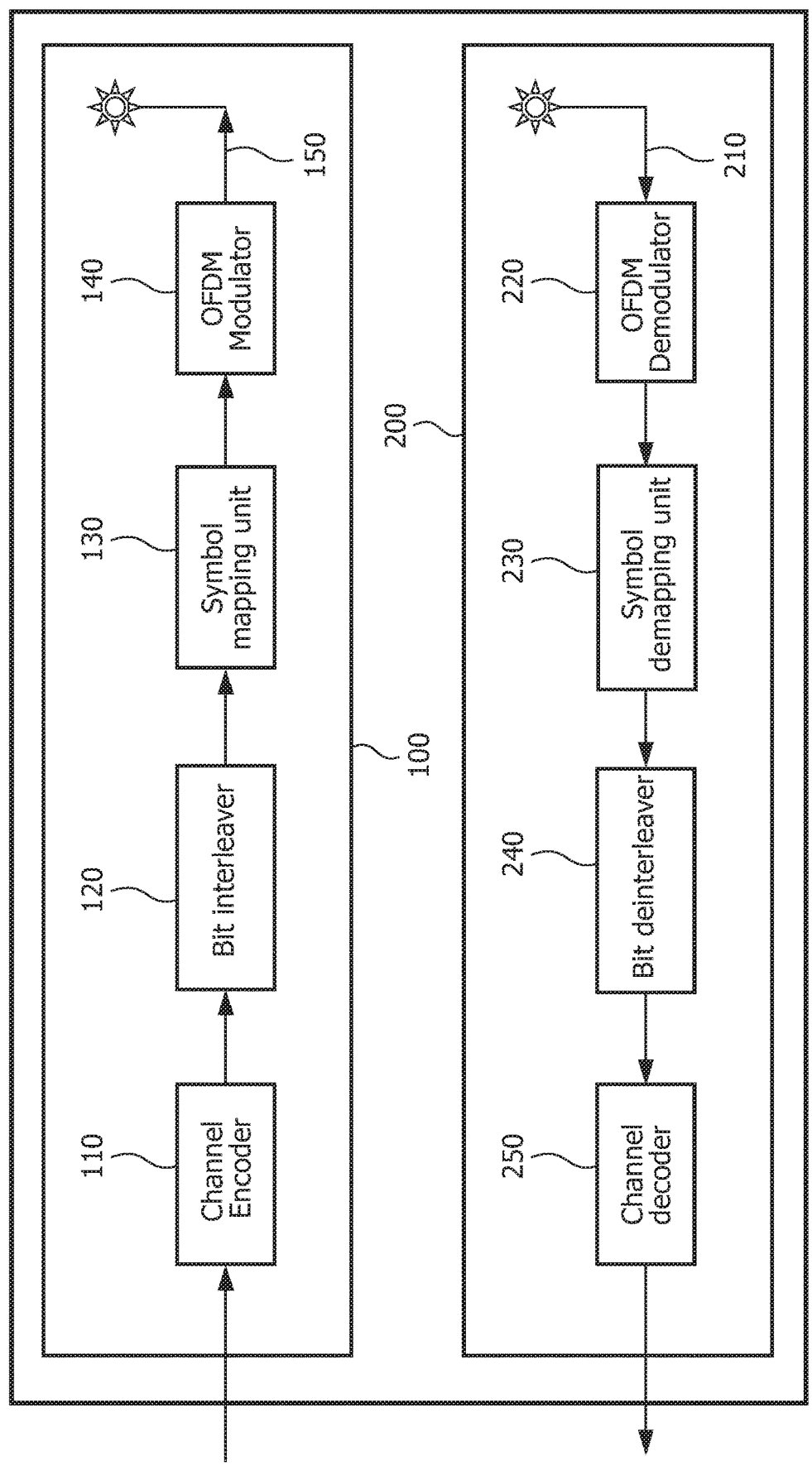
FIG. 1 is a block diagram of a conventional multi-band communication system.
Figure 2:
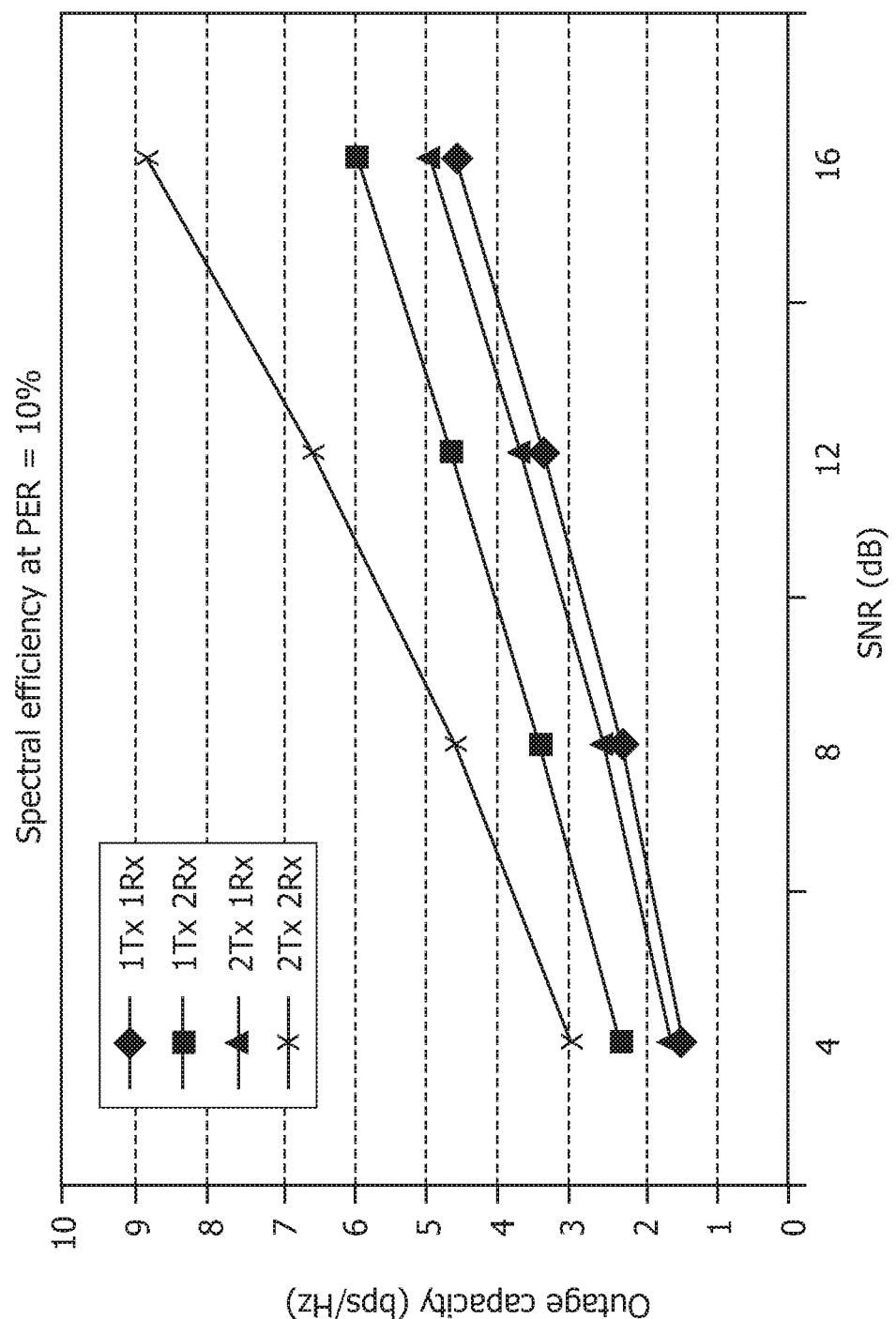
FIG. 2 is a chart showing the pass-losses of sub-bands within a UWB channel.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
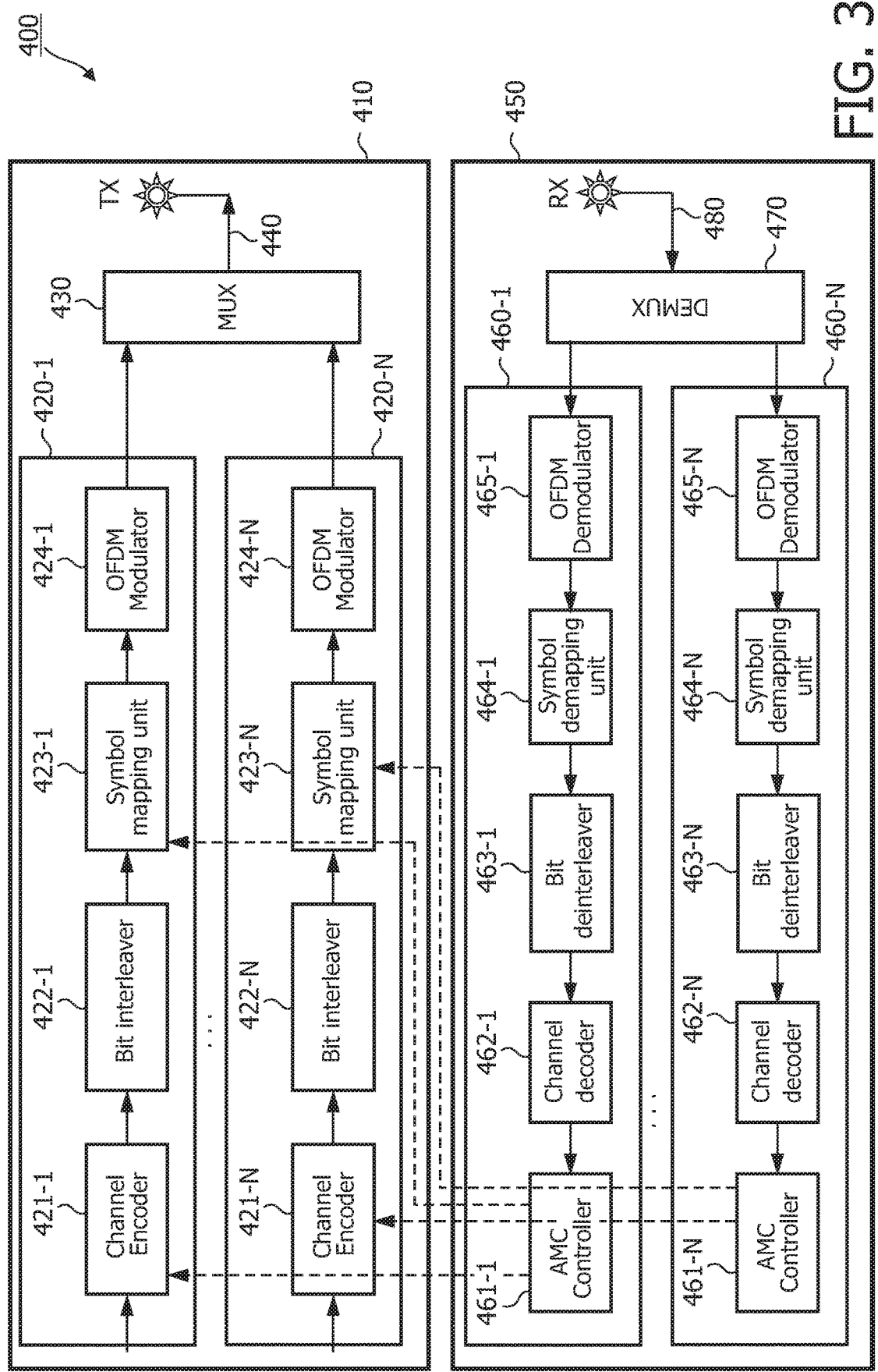
FIG. 3 is a block diagram of a multi-band communication system implemented in accordance with one embodiment of the invention.

FIG. 3 shows a non-limiting and exemplary block diagram of a multi-band wireless system 400 implemented in accordance with certain embodiments of the invention. The system 400 performs a parallel coding technique where multiple encoders and decoders are used in parallel and each set of an encoder and decoder operates on data transmitted and received though a single sub-band. In one embodiment, the system 400 may be a WiMedia UWB system that supports data rates of 1 Gbps and above.

The system 400 comprises a transmitter 410 and a receiver 450 that communicate over a wireless medium. The transmitter 410 includes a plurality of transmit channels 420-1 through 420-N where N is a positive integer greater than 1, a multiplexer (MUX) 430, and a transmit antenna 440. Each transmit channel 420-X, where X is a positive integer, transmits OFDM symbols through a single sub-band and includes a channel encoder 421-X, a bit interleaver 422-X, a symbol mapping unit 423-X, and an OFDM modulator 424-X.

The receiver 450 includes a plurality of receive channels 460-1 through 460-N, a demultiplexer (DEMUX) 470, and a receive antenna 480. Each receiver channel 460-X receives OFDM symbols on a single sub-band and includes an adaptive modulation coding (AMC) controller 461-X, a channel decoder 462-X, a bit deinterleaver 463-X, a symbol demapping unit 464-X, and an OFDM demodulator 465-X. Each of the transmit antenna 440 and receive antenna 480 may include a single antenna, an array of antennas, or multiple of antennas in a MIMO configuration.

Each sub-band is configured with a channel code (used by the channel encoder 421-X and channel decoder 462-X) and a symbol constellation (used by the symbol mapping unit 423-X and symbol demapping unit 464-X). The channel codes and symbol constellations may be different for different sub-bands. That is, a channel encoder 421-1 may use different channel codes than a channel encoder 421-2. In addition, each of the channel encoders 421-X and channel decoders 462-X may be configured with a different coding rate, a different puncture pattern, or a different trellis structure. It would be apparent to one of ordinary skill in the art that the use of multiple transmit and receive channels in parallel increases the encoding/decoding speed and, thereby, the overall performance of the channel.

In accordance with one embodiment of the invention, input information bits to be transmitted are split into N streams and input to transmit channels 420-1 through 420-N. By each transmit channel 420-X information bits are sent through a single sub-band. Specifically, a channel encoder 421-X encodes the input bits according to a channel code that it is currently set with. The channel code is determined by the AMC controller 461-X according to the condition of the link between the respective transmit channel 420-X and receive channel 460-X. A bit interleaver 422-X interleaves the encoded bit stream output by the respective channel encoder 421-X. In a preferred embodiment a bit interleaver 422-X performs only intra-sub-band interleaving operations. A symbol mapping unit 423-X maps the interleaved bits into ODFM symbols according to the symbol constellation set by an AMC controller 461-X of the respective receive channel.

An OFDM modulator 424-X of a transmit channel 420-X modulates a symbol stream into an OFDM symbol. Typically, such operation modulates the bits into sub-carriers in the OFDM symbol. The MUX 430 is a parallel-to-serial convertor that multiplexes OFDM symbols output by the modulators 424-1 through 424-N into a single stream. The multiplexing pattern is determined by a TFC that guarantees that all the OFDM symbols transmitted through the same sub-band are output on the same stream. As an example, FIG. 4 shows two different multiplexing patterns used by a TFC 510 and a TFC 520 respectively. Each TFC is configured to output a stream that includes nine symbols: $S_{11}$, $S_{12}$, $S_{13}$ (transmitted on a sub-band 1), $S_{21}$, $S_{22}$, $S_{23}$ (transmitted on a sub-band 2), and $S_{31}$, $S_{32}$, and $S_{33}$ (transmitted on a sub-band 3).

An OFDM symbol stream received at the receiver 450 is split into a number of N streams by the DEMUX 470. The DEMUX 470 is a serial-to-parallel convertor that performs the demultiplexing operation according to the same TFC pattern used by the MUX 430. All the OFDM symbols transmitted through the same sub-band are output to the same output stream which is processed by the respective receive channel 460-X. Specifically, each output OFDM symbol stream is demodulated by an OFDM demodulator 465-X to produce a symbol stream. Each symbol stream is demapped using a symbol demapping unit 464-X to generate the bit information based on a symbol constellation that it is set with. Each symbol demapping unit 464-X may use different symbol constellations. A bit deinterleaver 463-X recovers the data that was interleaved by the transmitter 410, then the recovered data is decoded by the channel decoder 462-X.

As mentioned above, an AMC controller 461-X selects the proper channel codes and symbol constellations for its respective channel encoder 421-X and channel decoder 462-X. The selection is made from a modulation coding set (MCS) and is based on, for example, the channel state information and/or the decoding results. For example, if the information bits were decoded with errors, the AMC controller 461-X may change the current channel codes and/or symbol constellations. The selected codes and constellations are fed back to the receptive transmit channel 420-X to adjust the symbol mapping and the channel encoding accordingly.

It is appreciated that the ability to use different channel codes and symbol constellations for different sub-bands allows optimizing the coding/decoding and symbols modulation/demodulation for each sub-band independently. This would allow achieving a higher throughput and lower data error rate compared to conventional UWB MB-OFDM systems.

Figure 5:
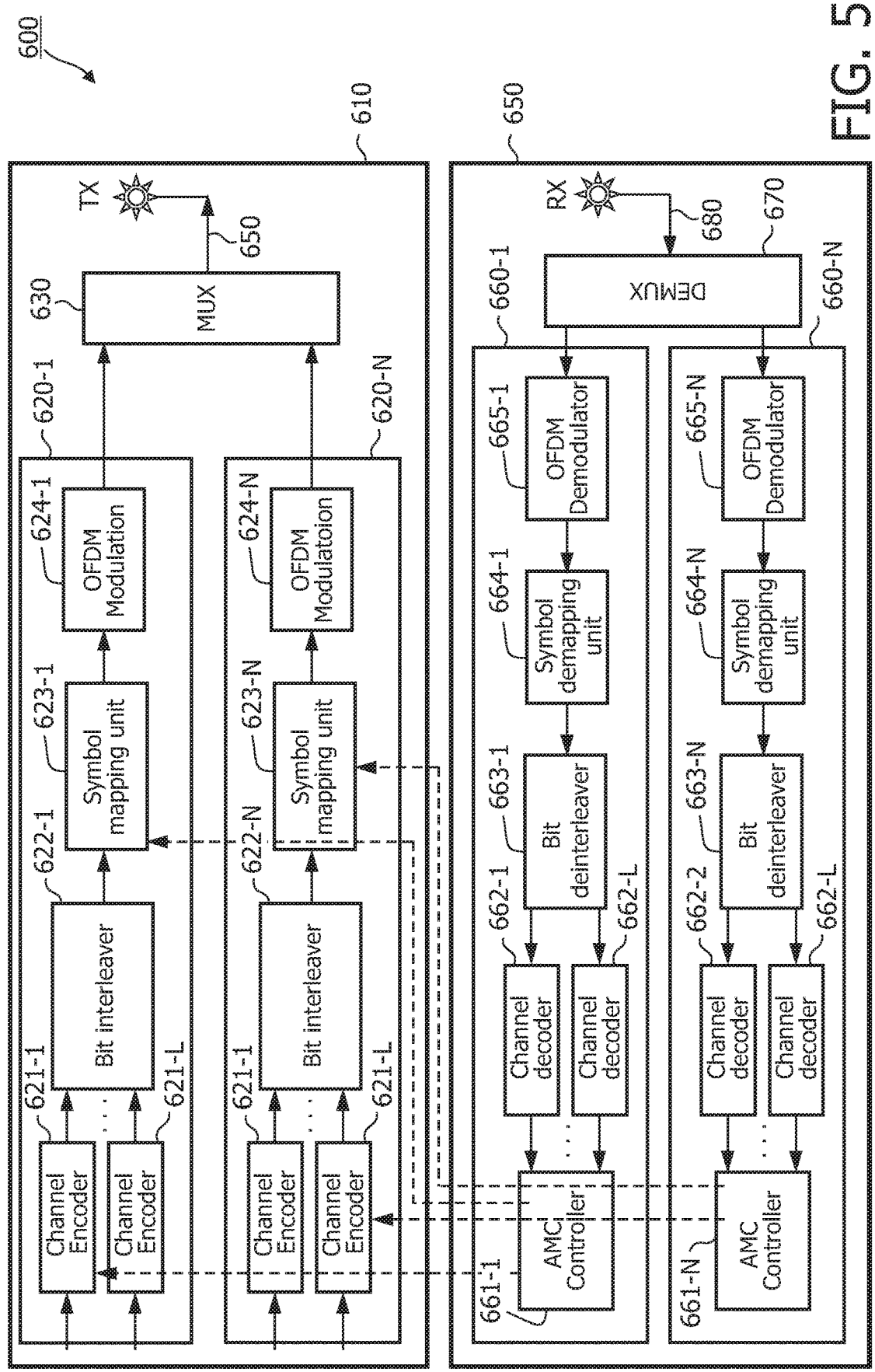
FIG. 5 is a block diagram of a multi-band communication system implemented in accordance with another embodiment of the invention.

In accordance with certain embodiments of the invention, in addition to using different channel codes and symbol constellations for different sub-bands, different codes can be utilized to decode or encode information bits. As illustrated in FIG. 5, to enable this mode of operation a multi-band communication system 600 includes a plurality of channel encoders 621-1 through 621-L, where L is a positive integer greater than 1, in each of the respective transmit channels 620-1 through 620-N, and a plurality of channel decoders 662-1 through 662-L in each of the respective receive channels 660-1 through 660-N. Each of the channel encoders 621-1 through 621-L and each of the channel decoders 662-1 through 662-L is configured with a different channel code. The selection of the channel codes to be used by each channel encoder 621-X or channel decoder 662-X is performed by the AMC controller 661-X.

In the system 600 the bit interleavers 622-X and bit deinterleavers 663-X are designed to support different bit streams generated by the channel encoders 621-X or input to the channel decoders 662-X. Specifically, a bit interleaver 622-X interleaves the output of the channel encoders 621-X (of a given transmit channel 620-X) in such way that the output bits of a sub-band are transmitted through different sub-carriers within the sub-band.

Figure 6:
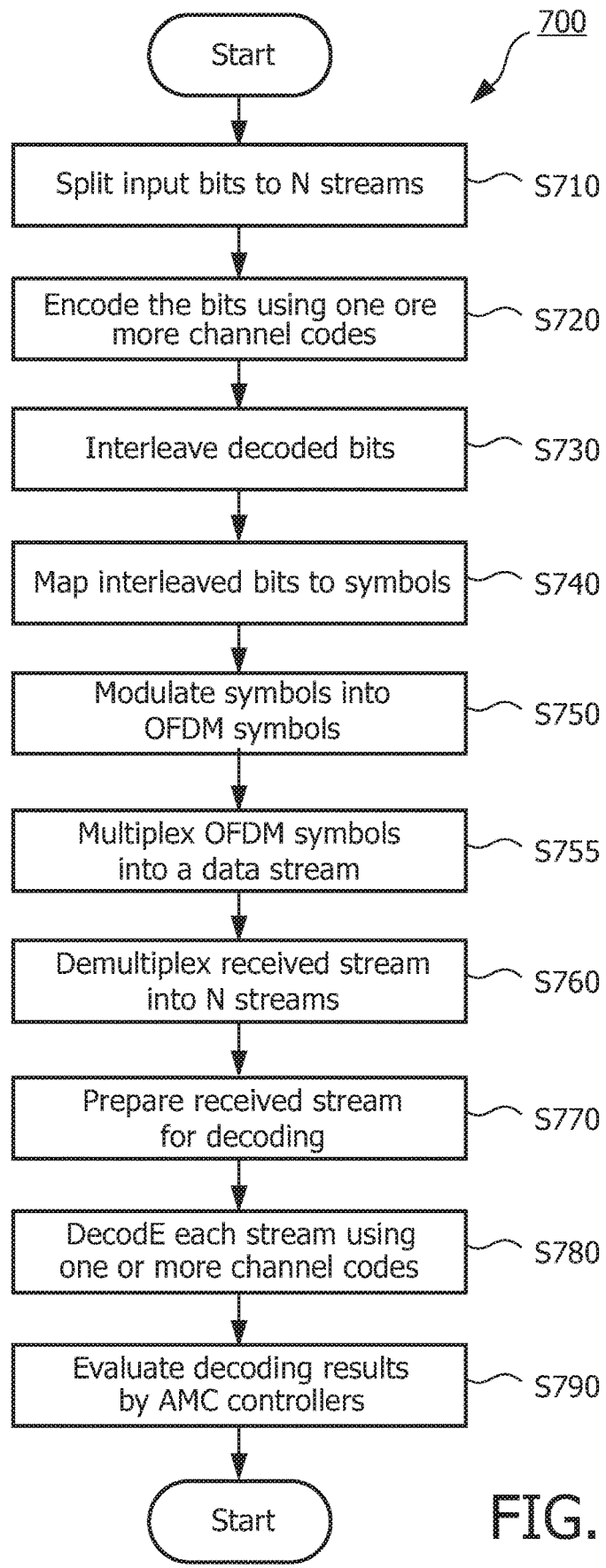
FIG. 6 is a flowchart describing the method of operation of a multi-band communication system implemented according to one embodiment of the invention.

FIG. 6 shows a non-limiting and an exemplary flowchart 700 describing the method of operation of a multi-band communication system as implemented according to one embodiment of the invention. At S710 input information bits are split into N streams, where each stream is input to a transmit channel (e.g., a transmit channel 420-X) to be transmitted on a single sub-band. At S720, by each transmit channel the bits are encoded either using a single channel code or a plurality of channel codes. The code(s) are selected at least based on the channel condition by an AMC controller. As mentioned above, different transmit channel may use different channel codes for this purpose. At S730 the decoded bits are interleaved by performing intra-sub-band interleaving. Then at S740 the interleaved bits are mapped into symbols using symbol constellations set by an AMC controller. Each transmit channel may be set with different constellations. At S750 the symbols are modulated into OFDM symbols. At S755, when OFMD symbols of all sub-channels are ready to be transmitted, these symbols are multiplexed according to a TFC pattern. The multiplexing ensures that OFDM symbols of a given sub-band are transmitted in the same stream.

At S760, the transmitted stream is received at a receiver which demultiplexes the stream to N receive channels, where each channel receives OFDM symbols belonging to its respective sub-band. By each receive channel, at S770 a symbol is demodulated, de-mapped and de-interleaved to generate a bits stream that can be decoded by a channel decoder. At S780 the decoding operation is performed using the channel code or codes used by the respective encoder. At S790 the decoding results are evaluated by an AMC controller. If the results are not sufficient (e.g., a high error rate) the AMC controller selects a new channel code(s) and/or symbol constellations and feedbacks the selections to the respective transmit channel. This allows optimizing the process of channel decoding and encoding, as well as the mapping and demapping symbols.

The foregoing detailed description has set forth a few of the many forms that the present invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A multi-band Ultra-wideband (UWB) communication system, comprising:
   a transmitter configured to transmit input information bits, split into streams, using a plurality of transmit channels in parallel through a single sub-band in each transmit channel, wherein each sub-band in each transmit channel is set with a different channel code and a different modulation symbol, wherein each sub-band is a UWB sub-channel; and
   a receiver configured to receive the streams on the single sub-band using a plurality of receive channels in parallel, wherein the streams received on the single sub-band are decoded using a channel code and a modulation symbol associated with the single sub-band.

2. The system of claim 1, wherein the modulation symbol comprises an orthogonal frequency-division multiplexing (OFDM) symbol.

3. The system of claim 1, wherein each transmit channel comprises at least a channel encoder and a symbol mapping unit.

4. The system of claim 3, wherein for each transmit channel the channel encoder is set with the different channel code to encode the input information bits, and the symbol mapping unit is configured with a different symbol constellation to map an encoded stream to a symbol.

5. The system of claim 4, wherein each receive channel comprises at least an adaptive modulation coding (AMC) controller, wherein the AMC controller adaptively determines the channel code and the symbol constellation.

6. The system of claim 5, wherein the channel code and the symbol constellation are determined based on a condition of a link between a transmit channel and its respective receive channel.

7. The system of claim 2, wherein OFDM symbols transmitted through the plurality of sub-bands are multiplexed based on a time frequency code.

* * * * *